United States Patent [19]

Albinson

[11] Patent Number: 5,010,356
[45] Date of Patent: Apr. 23, 1991

[54] METHOD OF FORMING AN ADHERENT FLUOROSILANE LAYER ON A SUBSTRATE AND INK JET RECORDING HEAD CONTAINING SUCH A LAYER

[75] Inventor: Rosemary B. Albinson, London, England

[73] Assignee: XAAR Limited, England

[21] Appl. No.: 415,726

[22] Filed: Oct. 2, 1989

[30] Foreign Application Priority Data

Oct. 19, 1988 [GB] United Kingdom ................. 8824436
Mar. 20, 1989 [GB] United Kingdom ................. 8906380

[51] Int. Cl.$^5$ ...................... G01D 15/18; B05D 5/08; B05D 7/24
[52] U.S. Cl. ................................. 346/140 R; 346/1.1; 427/387; 427/407.1; 427/412.1; 427/412.5; 427/409
[58] Field of Search .................... 427/387, 407.1, 409, 427/412.1, 412.5; 428/447; 346/75, 1.1, 140 R

[56] References Cited

U.S. PATENT DOCUMENTS

| | | | |
|---|---|---|---|
| 4,006,271 | 2/1977 | French et al. | 427/164 |
| 4,218,508 | 8/1980 | Humphrey | 428/331 |
| 4,343,013 | 8/1982 | Bader et al. | 346/140 R |
| 4,368,476 | 1/1983 | Uehara et al. | 346/140 R |
| 4,479,982 | 10/1984 | Nilsson et al. | 427/41 |
| 4,555,062 | 11/1985 | You | 239/690 |
| 4,623,906 | 11/1986 | Chandrashekhar et al. | 346/140 R |
| 4,643,948 | 2/1987 | Diaz et al. | 428/422 |

FOREIGN PATENT DOCUMENTS

| | | |
|---|---|---|
| 0092229 | 10/1983 | European Pat. Off. |
| 0092230 | 10/1983 | European Pat. Off. |
| 0121623 | 10/1984 | European Pat. Off. |
| 0146995 | 12/1984 | European Pat. Off. |
| 0177316A2 | 9/1985 | European Pat. Off. |
| 0195292 | 2/1986 | European Pat. Off. |
| 0215676 | 9/1986 | European Pat. Off. |
| 3543875A1 | 7/1986 | Fed. Rep. of Germany |
| 60-178065 | 9/1985 | Japan |
| 1385294 | 5/1973 | United Kingdom |

OTHER PUBLICATIONS

R. Ramharack et al, "Fluoropolymers of Very Low Surface Energies", pp. 93–98, Journal of Polymer Science: Part C: Polymer Letters, vol. 25 (1987).

A. G. Pittman et al, "Polymers Derived from Fluoroketones. III. Monomer Synthesis, Polymerization, and Wetting Properties of Poly(allyl Ether) and Poly(vinyl Ether)*", pp. 1741–1750, Journal of Polymer Science: Part A-1 vol. 6 (1968).

D. F. Untereker et al, "Chemically Modified Electrodes", pp. 309–318, J. Electroanal Chem., 81 (1977).

K. L. Mittal et al, "Vapor Deposited Silanes and Other Coupling Agents", pp. 93–97, J. Adhesion, 1976, vol. 8.

Pittman et al, "Polymers Derived from Fluoroketones. IV. Poly (1,4-Bis(Heptafluoroisopropoxy)-2-Butene Oxide)", pp. 873–877, Polymer Letters vol. 8, (1970).

M. Mitsuya et al, "Structure of Vacuum-Deposited Perfluorocarboxylic Acid Film", pp. 287–289, Journal of Colloid and Interface Science, vol. 107, No. 1, Sep. 1985.

N. Higashi et al, "Stabilization and Facilitated Deposition of Surface Monolayers of Fluorocarbon Amphiphiles Through Polyion Complex Formation", pp. 105–108, Chemistry Letters (1986).

M. Bernett et al, "Wetting Properties of Tetrafluoroethylene and Hexafluoropropylene Copolymers", pp. 1292–1294, vol. 64, Sep. 1960.

M. Bernett et al, "Wetting Properties of Polyhexafluoropropylene", pp. 2266–2267, vol. 65, Dec. 1961.

V. R. Gray, "Contact Angles, Their Significance and Measurement", pp. 99–119, S.C.I. Monograph No. 25.

(List continued on next page.)

Primary Examiner—Evan Lawrence
Attorney, Agent, or Firm—Marshall, O'Toole, Gerstein, Murray & Bicknell

[57] ABSTRACT

A method of reducing the wettability of non-vitreous surfaces, and ink jet recording heads including a surface having reduced wettability, are provided wherein a layer of cured siloxane is formed on the non-vitreous surface and a layer comprising at least one fluorosilane is formed on the siloxane layer.

38 Claims, 1 Drawing Sheet

OTHER PUBLICATIONS

A. G. Pittman, "Surface Properties of Fluorocarbon Polymers", pp. 419–449, Agricultural Research Services, U.S. Department of Agriculture (undated).

W. A. Zisman, "Influence of Constitution on Adhesion", pp. 33–71, Handbook of Adhesives, Second Edition, (undated).

G. J. Ratchford, "Nozzle Plate", p. 1040, IBM Technical Disclosure Bulletin, vol. 26, No. 3A, Aug. 1983.

F. Anger, et al, "Low Surface Energy Fluoro-Epoxy Coating for Drop-On-Demand Nozzles", p. 431, IBM Technical Disclosure Bulletin, vol. 26, No. 1, Jun. 1983.

R. D. Balanson, et al, "Low Energy Coating for Drop-On Demand Silicone Nozzles", p. 294, IBM Technical Bulletin, vol. 23, No. 1, Jun. 1980.

J. I. Crowley et al, "Nozzles for Ink Jet Printers", p. 4371, IBM Technical Disclosure Bulletin, vol. 25, No. 8, Jan. 1983.

H. H. Weetall et al, "Porous Glass for Affinity Chromatography Applications", pp. 59–72, Methods of Chromatography, vol. 34 (undated).

J. Roitman et al, "Wetting Properties of Acrylic Polymers Containing Perfluoro-t-Butyl Side Chains", pp. 499–503, Polymer Letters vol. 10 (1972).

M. Bernett et al, "Wetting Properties of Acrylic and Methacrylic Polymers Containing Fluorinated Side Chains", pp. 207–208, J. Physics Chem., vol. 66, Jun. 1962.

English Abstract of Japanese Patent Application 61-167567, "Water Repellent Treatment of Ink Jet Head", Jul. 1986.

Kamimori et al, "Chemical Abstracts", vol. 81, p. 138, abstract No. 154763k, 1974.

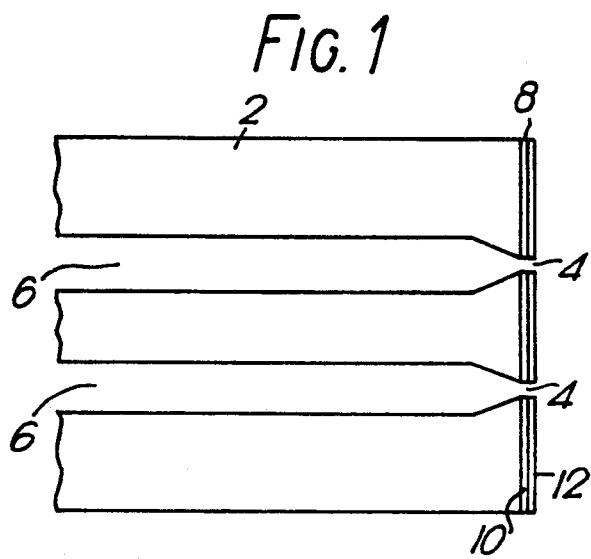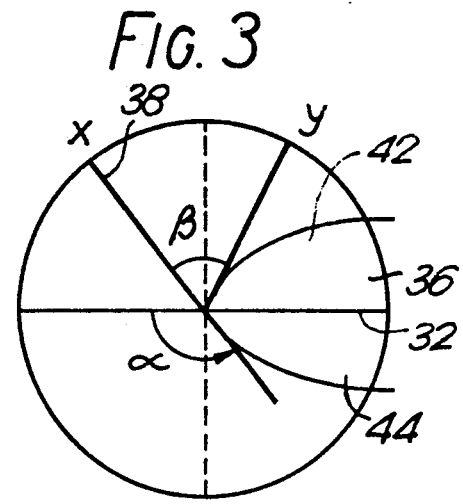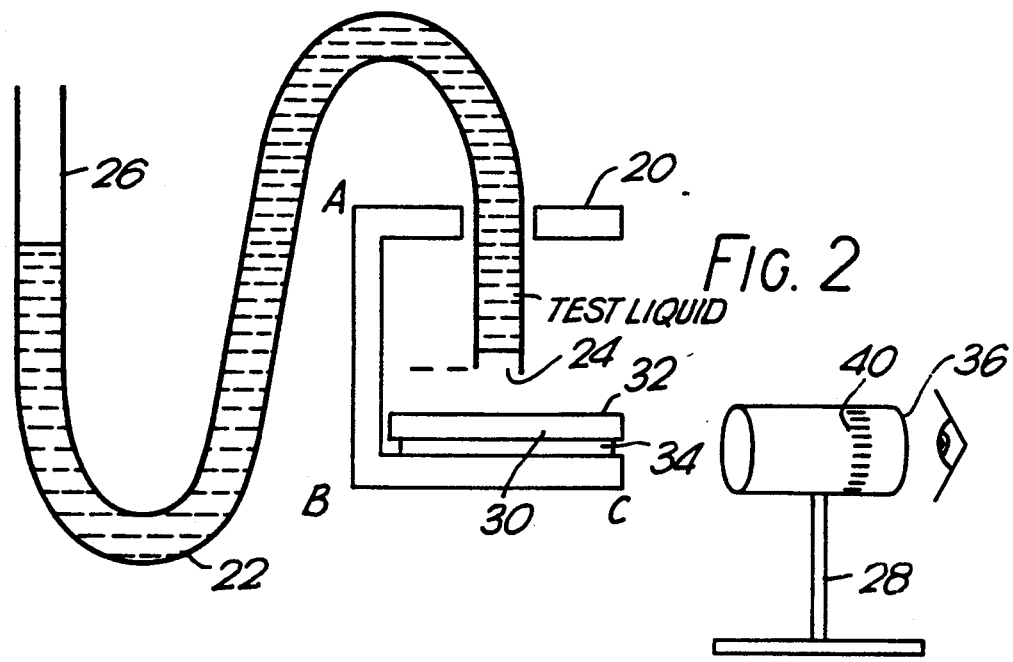

METHOD OF FORMING AN ADHERENT FLUOROSILANE LAYER ON A SUBSTRATE AND INK JET RECORDING HEAD CONTAINING SUCH A LAYER

BACKGROUND OF THE INVENTION

1. Field of the Invention

The invention relates to a method of reducing the wettability of the surface of a substrate by providing an adherent layer of fluorosilane on the surface, and to an ink jet recording head including a surface coated with such a layer.

2. Description of Related Technology

The ink jet recording method is a method wherein recording liquid (i.e. ink) is jetted in the form of droplets from an ink jet recording head toward a receiving surface such as of paper on which the droplets are deposited to effect printing.

In one such method, generally referred to as the continuous method, a stream of electrically charged ink droplets is generated while controlling the charge by a continuous oscillation generating means. The droplets, each with a controlled level of electric charge are jetted toward the receiving surface, e.g. a paper sheet, and the flying course of the droplets is controlled by a pair of deflecting electrodes to which an electric field is applied and between which the droplets pass.

In another such method, generally referred to as the drop-on-demand method, a piezoelectric oscillator is mounted on the ink jet recording head and is mechanically oscillated by application of an electric recording signal.

Typically, the recording head includes a fine pipe for the ink which opens into an orifice. The surface surrounding the orifice may be of the same material as the pipe, or the orifice may be formed in a plate, called the orifice plate, which is attached to the end of the pipe and may be of a material different from that of the pipe. For the purposes of this invention, the orifice plate, if present, is considered to form part of the recording head.

In either case, it has been found desirable for at least a part of the surface of the head to have poor wettability toward the solvent employed for the ink. In some cases, it is also desirable for another part of the surface to have good solvent-wettability. For example, in some head designs, it has been found desirable for at least one part of the surface to remain essentially unwetted by the ink, in order to avoid problems of reliability in operation, and for at least another part to be wettable, e.g. so that another component may be bonded to the face of the head. In one specific embodiment it has been found that where the surface of the area surrounding the orifice is made from certain preferred non-vitreous materials such as metals, ceramics or plastics, problems can arise as a result of the ink wetting the surface and forming a pool which surround the orifice. This pool can interfere with the proper operation of the printer and prevent continuous operation of the printer for more than short periods of time.

There is therefore a need for at least a part of the surface of the recording head, e.g. that part surrounding the orifice, to be treated so that it is less readily wettable by liquids, and in particular by the ink or, more particularly, by the solvent employed in the formulation of the ink, and much research time has been expended on resolving this need. See, for example, in U.S. Pat. Nos. 4,343,013; 4,555,062; and 4,623,906, and European Patent Publications 177,316; 92,229; 92,230; and 121,623.

It is known that the tendency of a surface to be wetted by water or other solvents of the kind used in ink formulations can be reduced by coating the surface with an organic fluoro compound. However, it has been found that prior proposals for applying such fluoro compounds to the surface of non-vitreous substrates such as of metal, ceramics or plastic suffer from one or more disadvantages. For example, PTFE does not have the desired non-wettability for some of the preferred solvents and is difficult to bond to some surfaces. Coatings of fluorinated polymers of the kind proposed for use in mcirocircuitry, on the other hand, do not adhere sufficiently strongly and could be removed during normal procedures used for cleansing the head, such as wiping. Examples of such coatings are SC-721 marketed by 3M Nyebar marketed by Nye, and Galydene marketed by Montedison.

U.S. Pat. No. 4,643,948 proposed coating the surface of an ink jet recording head with a partly fluorinateda alkyl silane and a perfluorinated alkane; however, the only method described for forming the coating involves radio frequency glow discharge.

IBM Technical Disclosure Bulletins Vol. 23, No. 1 of June 1980; Vol. 26, No. 1 of June, 1983; and Vol. 26, No. 3A of Aug. 1983; and U.S. Pat. No. 4,368,476 are representative of proposals for treating the recording head face with a fluorosilicon compound, e.g. by dipping the surface in a dilute solution of the compound. However, it has been found that while some of the coatings could exhibit adequate non-wetting characteristics, their adhesion to non-vitreous surfaces, especially plastic surfaces, is inadequate.

The chosen surface layer, of course, must also be resistant to the ink solvent and this has presented a particular problem in the case of some of the solvents which are now gaining favor, such as those of the glycol or glycol ether kind. For example, it is known, for example from Japanese Kokai 74-31767, to vacuum coat a plastic surface with silicon oxide film and then apply a coating of fluorosilane; however, it has been found that the surface of the coated product thereby obtained is crazed by contact with some of the preferred ink solvents. The layer, e.g. coating, which provides the desired non-wetting characteristics must also adhere well to the substrate, be abrasion resistant, and be resistant to attack by solvents employed in inks used in ink jet printing. Adhesion presents a particular problem where the substrate is non-vitreous and especially where it is formed of plastic.

U.S. Pat. No. 3,953,115 describes forming an adherent optically clear abrasion resistant coating on a plastic opthalmic substrate, using a partially hydrolyzed solution of a vinyl tri(lower alkoxy) silane. U.S. Pat. No. 4,006,271 applies a solution of a hydrolyzed $C_{1-2}$ alkyl tri(lower alkoxy) silane to a polycarbonate.

SUMMARY OF THE INVENTION

It is an object of the invention to overcome one or more of the problems described above.

According to the invention, there is provided an ink jet recording head of the type in which ink droplets are jetted from a jet orifice of the head toward a recording material and wherein the surface of the head has at least one zone which exhibits good solvent-wettability and at least one zone which exhibits poor solvent-wettability, and wherein the latter zone comprises a layer of fluorosilane bonded to the surface by means of an intermediate layer comprising cured siloxane.

The invention also provides an ink jet recording head of the type described above wherein the surface of at least the area of the head surrounding the jet orifice comprises plastic or non-vitreous inorganic material and is coated with a fluorosilane layer which reduces the wettability of the surface, wherein a first layer comprising cured siloxane which is adherent to the surface is interposed between the surface and the fluorosilane layer, and the fluorosilane layer is derived from at least one fluorosilane having at least one hydrolyzable group attached to a silicon atom.

By a "fluorosilane" is meant a silicon compound having at least one fluorinated organic group attached to a silicon atom. The term "non-vitreous"denotes materials not made of glass.

There is also provided a method of reducing the wettability of a surface comprising plastic or nonvitreous inorganic material by providing an adherent layer of fluorosilane on the surface, comprising the steps of:

(a) forming on the surface an adherent first layer comprising cured siloxane; and
(b) applying to the first layer a second layer comprising at least one fluorosilane having at least one hydrolyzable group attached to a silicon atom and at least one fluorine-containing organic group attached to a silicon atom, said fluorine-containing organic group donating non-wetting properties to the second layer.

Other objects and advantages of the invention will be apparent to those skilled in the art from a review of the following detailed description, taken in conjunction with the drawings and the appended claims.

BRIEF DESCRIPTION OF THE DRAWINGS

FIG. 1 is a schematic cross-sectional view of part of an ink jet recording head provided with a non-wetting coating according to the invention.

FIG. 2 is a schematic diagram of an apparatus for measuring receding angle.

FIG. 3 is a schematic diagram illustrating measurement of receding angle using the apparatus of FIG. 2.

DETAILED DESCRIPTION OF THE INVENTION

While the invention may be applied to a variety of inorganic surfaces such as those of metal or ceramics, it finds special benefit in its application to surfaces of plastic material. Examples of such surfaces are those of acrylics, polyimide, polycarbonate, polyester, polyether-ether-ketone, and polyolefin, e.g. polyethylene; however, the invention is particularly important for the treatment of laser-ablatable plastic materials because the first and second layers can also be rendered laser-ablatable, thereby enabling the formation of orifices in an ink jet recording head after the wettability of the surface of the head has been reduced in accordance with the invention, thus reducing the number of steps required to form the orifices.

The plastic material whose surface may be treated by the process of the present invention may include additives of the kind normally employed with plastics, including organic and/or inorganic fillers; however, the surface itself is preferably essentially, i.e. substantially entirely, plastic material.

The adherent cured siloxane layer is obtainable by coating the surface with a silane and treating the coating to interlink the silane molecules of the coating, i.e. polymerize the silane, by the development of Si—O—Si linkages to effect curing. In general, this is achieved by choosing as the silane a compound having hydrolyzable groups and a nonhydrolyzable organic group attached to a silicon atom and hydrolyzing at least some of the hydrolyzable groups to form Si-OH groups which are then caused to react with corresponding groups, or with hydrolyzable groups such as alkoxy groups attached to Si atoms of other molecules in the layer, to form Si—O—Si linkages with loss of water or other by-product(s) of the condensation.

Normally the silane will be applied in the form of a solution, the solvent of which is then removed, as by volatilization.

To achieve the desired adherent cured siloxane layer, it is preferred that all but one of the radicals attached to a silicon atom be hydrolyzable groups. Preferably, the hydrolyzable groups are selected from alkoxy groups since the hydroysis products are alcohols which, with appropriate choice of the solvent, can readily be removed with the solvent. Most preferably, the alkoxy group has up to 3 carbon atoms.

The nature of the other group attached to the silicon atom of the silane chosen to form the siloxane layer will depend at least in part upon the nature of the surface to be coated. The bond between the first layer and the surface may be chemical, e.g. by reaction of active groups in the silane with groups reactive therewith in the surface to be coated, or it may be physicochemical e.g. as in Van de Waal's bonds (that is, dipole-dipole bonding), hydrogen bonding or $\pi$-$\pi$bonding. For example, where the substrate is a polymer containing residues of a benzene or other aromatic or pseudoaromatic ring, e.g. as in aromatic polyimides, aromatic polyether-ether-ketones and aromatic polycarbonates, and adhesion to the substrate is achievable by $\pi$-$\pi$bonding, the silane may contain at least one group having E,$\beta$-ethylenic unsaturation, e.g. an allyl group. Alternatively, where, for example, the substrate surface contains OH groups and adequate adhesion by hydrogen-bonding is achievable, the silane may desirably contain at least one group containing an active or Zerewitinoff hydrogen atom, e.g. as in a primary or secondary amino-alkyl.

Preferably, therefore, in accordance with one embodiment of the invention the silane satisfies the formula $$YSi(OR)_3$$

where each R is an alkyl group and Y is a nonhydrolyzable monovalent organic radical. Suitably, Y is a saturated or unsaturated monovalent hydrocarbon group or a substituted derivative thereof. For reasons such as availability or ease of synthesis of the compounds and cost, Y will generally be selected from alkyl and alkenyl groups especially those containing 1 to 6 carbon atoms, and substituted derivatives thereof wherein each substituent is selected from halogen, alkoxy and primary, secondary or tertiary amino. Examples of such groups include, without limitation, methyl, ethyl, ally, methallyl, $\gamma$-aminopropyl, $\gamma$-methlaminopropyl, $\gamma$-dimethylaminopropyl, and methoxyethyl.

A particularly good combination of adhesion to the substrate surface and resistance to abrasion is obtained if the silane employed to form the adherent cured siloxane coating comprises a mixture of silanes which includes a silane containing a primary, secondary or tertiary aminoalkyl group; preferably a mixture of at least one first silane selected from primary, secondary and tertiary-aminoalkyl trialkoxysilanes and at least one second silane selected from alkyl trialkoxysilanes, preferably where the alkyl and alkoxy groups each contain up to 3 carbon atoms. Particularly good results are achieved from a mixture of a major amount of alkyl trialkoxy silane and a minor amount of aminoalkyl trialkoxysilane, e.g. from 75 to 60% by weight of the former and from 25 to 40% by weight of the latter. Examples of suitable compounds are methyl triethoxysilane and γ-aminopropyl triethoxysilane.

However, where laser ablatability of the siloxane layer is important, it may be desirable to include in the cured siloxane layer a photoabsorbing molecule to assist the ablation or to form the siloxane layer from a silane having good photoabsorption characteristics, or form a mixture of silanes which includes a silane having such characteristics. Examples of silanes having the desired characteristics are those which include aliphatic carbon-carbon unsaturation, e.g. as in an allyl group or a methallyl group. Thus, in this embodiment of the invention some or all of the alkyl trialkoxysilane may be replaced by alkenyl trialkoxysilane, e.g. allyl triethoxysilane.

Preferably, the silane or silane mixture employed to form the siloxane layer is at least partially hydrolyzed prior to its application to the substrate so as to facilitate subsequent curing of the layer. This may be achieved, for example, by standing a solution of the silane over water. Hydrolysis may be assisted by dilute acid.

Where the silane or mixture of silane is applied as a solution, any suitable solvent or solvent mixture may be employed. Preferably, a solvent having a low boiling point is employed so that it is readily removable by evaporation. However, too high a rate of solvent removal may generate stresses in the layer which could lead to crazing. It may therefore be desirable to include a small propart of a tail solvent.

One method of achieving the preferred cured siloxane layer thickness of not more than a few microns, e.g. 0.01 to 10 microns, is to apply a solution of the silane by spin-coating. Removal of the solvent and curing may be achieved by heat. It is preferred that the cured layer contains some free hydroxyl groups attached to silicon atoms, i.e. Si—OH groups, since this appears to assist the bonding of the second layer. This may be achieved, for example, by effecting at least the final stages of the heating step in the presence of water vapor. Howver, this is not essential.

Thus, one preferred method of forming the cured siloxane layer comprises spin-coating the surface with a solution of the silane wherein the silane is in an at least partially hydrolyzed form, and thereafter heating the coated surface to drive off the solvent and cure the silane until an adherent coating is obtained.

In addition to enabling the adhesion of the fluorosilane layer to the substrate, the presence of the cured siloxane layer may also provide other benefits. One is that it assists planarization of the surface thereby enhancing the non-wetting characteristics of the surface of the eventual fluorosilane-coated product. Another is that in the case of the preferred plastic surfaces such as polyimide it improves the durability and scratch resistance of the product and hence its ability to withstand mechanical handling.

In the second step of the process, a layer derived from at least one fluorosilane is applied to the cured siloxane layer. The fluorosilanes suitable for use in this step are chosen from those having at least one hydrolyzable group attached to a silicon atom and at least one fluorine-containing organic group attached to a silicon atom, the fluorine-containing organic group being one which donates desired non-wetting properties to the layer.

In one embodiment, the fluorosilanes may be selected from those satisfying the formula:

$$R^2_m SiR^3_n$$

where m and n are integers, m is one or two, n is at least two, and sum of m plus n is four, each $R^2$ is a fluorine-containing organic group and each $R^3$ is a hydrolyzable group. Preferred hydrolyzable groups are alkoxy, most preferably containing 1 to 3 carbon atoms.

While m may be 1 or 2, it is not thought that any improvement in anti-wetting properties is achieved where m is 2 and on the other hand the adhesion to the first layer may be reduced. Therefore, it is preferred that m is 1 and n is 3.

The anti-wetting properties donated by the fluorosilane layer tend to be a function of the nature of $R^2$. In general, the anti-wetting properties improve with increase in the degree of fluorination of the terminal region of $R^2$; that is, the region of $R^2$ at or towards the other end of $R^2$ from that by which it is attached to the Si atom. Preferably $R^2$ will contain at least one $CF_3$—group in the terminal region.

The group to which the fluorine atoms are attached may be any suitable organic group, but generally it will be a saturated group, e.g. alkyl, alkoxyalkyl, or alkylcarboxyalkyl.

For example, $R^2$ may have the structure $$X_3C-(CF_2)_x-(Z)_y-(CH_2)_z-$$

where each X is F or $CF_3$, Z is a divalent atom or group such as —O—, each of x and z is zero or a positive integer and y is zero or one. One or more of the fluorine atoms in each —$CF_2$—group may also be replaced by a —$CF_3$ group, if desired.

Specific examples are:

$CF_3(CF_2)_9(CH_2)_2-$
$CF_3(CF_2)_5(CH_2)_2-$
$CF_3(CF_2)_3(CH_2)_2-$
$CF_3(CF_2)_xO(CH_2)_2-$
$(CF_3)_2CFO(CH_2)_3-$
$(CF_3)_3CCF_2OCH_2CH_2-$

One or more of the $R^2$ and or $R^3$ groups may be replaced by another monovalent atom or group, it being understood, of course, that the molecule retains at least one fluorine-containing group and at least one hydrolyzable group and that said other group does not prevent hydrolysis or adversely affect the non-wetting properties of the layer to an undesirable extent.

In accordance with this modification, the fluorosilane may have the formula $$R^2_m SiR^3_n R^4_p$$

where $R^2$ and $R^3$ are as defined above, each $R^4$ is a nonhydrolyzable atom or group other than $R^2$, m is 1 or 2, n is at least 1, p is 0, 1 or 2 and m+n+p =4; where $R^4$ is said other monovalent atom or group. An example of such an atom or group is F.

The fluorosilane layer may be formed by vacuum deposition from vapor of the fluorosilane and it has been found desirable to keep the humidity low to obtain the best adhesion. Alternatively, it may be applied as a solution in a suitable solvent which is then removed, e.g. by evaporation.

It is believed that the adhesion of the fluorosilane layer to the siloxane layer involves reaction of the hydrolyzable groups $R^3$. Where the first layer contains Si—OH groups it is believed that heating the second layer effects chemical reaction between hydrolyzable groups $R^3$ of the second layer and Si—OH groups of the first layer and achieves a chemical bond between the layers.

Whether or not actual chemical bonding occurs, it is in any event preferred to heat the second layer in contact with the first layer to achieve optimum adhesion.

Best results are obtained when the second layer is 5 microns thick or less. Above 5 microns little or no further improvement in anti-wetting properties is obtained and on the other hand, good results are achievable even with a layer which is only a few molecules, e.g. one or two molecules, thick.

Ink solvents with which the ink jet recording heads according to the present invention may be successfully employed include alcohols (e.g. isopropyl alcohol), halogenated organics (e.g. 1,1,1-trichloroethane) aromatic hydrocarbons (e.g. xylene), ketones (e.g. acetone), water, and solvents of the type based on naphthenic and paraffinic hydrocarbons and their mixture (e.g. the solvent sold as "Vista 47"), as well as the more aggressive glycol and glycol ether solvents such as the monomethyl ethers of di- and tri-propylene glycol, ethylene glycol butyl ether and diethylene glycol butyl ether.

EXAMPLE

The invention will now be illustrated with reference to an Example and with the aid of the accompanying drawings. In FIG. 1, a part of an ink jet recording head 2, illustratively of Kapton ®polyimide, is provided with orifices 4 opening into ink conduits 6 and a non-wetting coating, generally designated 8, comprising an adherent first layer 10 of cured siloxane and a second layer 12 of fluorosilane.

The non-wetting coating 8 was made into two stages, designated A and B. In the first stage (A), a thin cured siloxane layer 10 having residual free —OH groups was formed from solution on the surface of the Kapton ® polyimide. In the second stage (B) a fluorosilane was chemically coupled to the siloxane layer 10 to form a non-wetting surface. In the following description, all parts are by volume except where otherwise indicated.

(A) Formation of Siloxane Coating 13.75 parts methyl triethoxysilane (MTES) were mixed with 12.5 parts 0.01N HCl and 12.5 parts absolute ethanol in a clean glass vessel and allowed to stand for at least 3 hours to allow partial hydrolysis of the MTES to occur.

The coating solution was then made from 15 parts of the resulting solution, 0.25 part of acetic acid, 2 parts of ethylene glycol mononexyl ether and 2.5 parts of aminopropyl triethoxysilane and immediately filtered through a 2 micron filter. The filtered product had a working lifetime of 30 minutes to 1 hour.

Samples of Kapton ®polyimide sheet were cleaned using isopropanol and then coated with the solution by spin-coating to give a film of between 0.5 and 2 microns thick. The coating was allowed to air dry before being baked at 50° C. for 30 minutes, followed by 30 minutes at 45° C. and 95% relative humidity.

(B) Application of Fluorosilane Layer 300 parts of 1H,1H,2H,2H perfluorooctyl triethoxysilane (PFOTES) in a large shallow metal dish lined with aluminum foil were placed in the bottom of a dessicator and siloxane-coated Kapton ®polyimide sheets from stage (A) were arranged in a rack in the upper section of the chamber so that the siloxane coated surface of each was freely exposed.

The chamber was evacuated to approximately 50 torr for 10 minutes, brought up to room pressure using dry nitrogen, then reevacuated to 50 torr for a further 10 minutes to reduce the relative humidity to less than 10%.

The dessicator was then sealed, disconnected from the vacuum pump, placed for 2 hours in an oven which had been preheated to 180° C., and then allowed to cool for 15 minutes before being reconnected to the vacuum pump. The dessicator was then evacuated while it continued to cool. The samples were then removed after bringing the chamber back up to room pressure using dry nitrogen gas.

The samples were then submitted to a number of tests, described below, to assess their suitability for use in the production of ink jet recording heads.

The non-wetting characteristics in relation to ink solvents were assessed from the receding contact angle as measured by the following test procedure and using the apparatus diagrammatically illustrated in FIGS. 2 and 3, comprising a metal sample holder 20 of which the dimensions AB and BC were each 30 mm; a polypropylene tube 22 having an open end 24 and a free end 26; a travelling microscope 28, and a sample 30 having a coated surface 32 to be tested, and a piece of double-sided adhesive tape 34. An eyepiece 36 of the travelling microscope 28 has a cross hair graticule, one arm 38 of which is aligned with a mark on the external casing of the eyepiece 36 (FIG. 3). A scale 40 is marked around the cylindrical body of the eyepiece 36.

The polypropylene tube 22 is partially filled with the chosen solvent and placed in the metal holder 20 such that the open end 24 is firmly suspended about 2 mm above the coated surface 32 of the sample 30. The free end 26 is placed in a clamp so that it can be moved up and down. The intervening length of the tube 22 is constrained into an S-shape, as shown. By moving the free end 26 of the tube 22 up and down slowly it is possible to expel a drop of liquid 42 onto the surface 32 and suck it back up.

The liquid drop is illuminated at gazing incidence using a diffused light source (not shown). The drop and its reflected image are viewed through the travelling microscope 28. By rotating the eyepiece relative to the main body and noting the position of the external mark on the eyepiece, an angular measurement of the position of the arm 38 of the cross-hair can be made.

A freshly prepared sample 30 is positioned on the base of the sample holder using the double sided tape 34 and the liquid in the tube 22 is induced to flow over the surface 32 for a distance of a few millimeters by slowly raising the free end 26 of tube 22. After waiting for the liquid position to stabilize and become stationary, the free end 26 of the tube 22 is slowly lowered, thereby causing the liquid to be sucked back up the tube and the drop to be retracted back across the surface. When the drop has stabilized and become stationary in the retracted position, the receding angle is measured as the angle between the surface of the drop 42 (FIG. 3) and the sample surface at the point of contact of the drop with the surface. Both the angle of the actual drop 42 and that of its reflected image 44 are measured. With the microscope aligned so that the crossing point of the cross hairs is on the point of contact between the drop and the sample surface, measurement is effected by rotating the eyepiece so that the marked arm 38 of the cross hair is aligned first with the surface of the drop (position y in FIG. 3) and then with the image of that surface (position x in FIG. 3). The receding angle $\alpha = 90 + \beta/2$ where $\beta$ is the angle between x and y.

In general, a receding angle $\alpha$ of 150° or less is considered adequate.

Using tripropylene glycol monomethyl ether (TPM) as the liquid, a receding contact angle of 130° was observed, illustrating excellent non-wettability of the surface of the coated samples.

Abrasion resistance was evaluated by stroking a cotton bud soaked in solvent (TPM) across the surface of the sample. The non-wetting properties of the surface were still apparent after 1,000 strokes. By way of example, where the Kapton®polyimide samples were coated with proprietary coatings such as Nyebar and Galydene, the non-wetting properties were lost after 1 to 10 passes with the soaked cotton bud.

The coated Kapton®polyimide samples could be bent back on themselves, i.e. through about 180°, without cracking, thus indicating excellent adhesion of the coating to the plastics.

Resistance to solvents was assessed by immersing the samples in the solvent concerned. No crazing or other evidence of solvent attack was observed after at least fourteen days' immersion in each of the following solvents: acetone, water, diethylene glycol, tripropylene glycol monomethyl ether, paraffin, and Vista '47 solvent.

Similar results to those described above were also obtained using 1H, 1H, 2H, 2H-perfluorododecyl triethoxysilane as the fluorosilane.

By way of comparison, samples of Kapton®polyimide coated with proprietary non-wetting coatings such as Nyebar and Galydene showed evidence of solvent attack in as little as a few hours when the same solvents were employed.

Ink jet recording head orifice plates were obtained from the coated sheets by cutting them to the desired size and then forming passages for the ink in them by laser ablation.

If it is desired for a part or parts of the surface of the orifice plate to be wettable, the sheets may be masked appropriately prior to coating.

The foregoing detailed description is given for clearness of understanding only, and no unnecessary limitations should be understood therefrom, as modifications within the scope of the invention will be apparent to those skilled in the art.

I claim:

1. A method of reducing the wettability of a surface comprising plastic or non-vitreous inorganic material by providing an adherent coating of fluorosilane on said surface, said method comprising the steps of:
   (a) forming on said surface an adherent first layer comprising cured siloxane; and
   (b) applying to said first layer a second layer comprising at least one fluorosilane having a silicon atom to which is attached at least one hydrolyzable group and at least one fluorine-containing organic group which donates non-wetting properties to said second layer.

2. The method of claim 1 in which step (a) comprises coating said surface with at least one silane having hydrolyzable groups and a non-hydrolyzable organic group attached to a silicon atom and treating the resulting coating to form a cured siloxane layer which is adherent to said surface.

3. The method of claim 2 wherein said silane is of the formula $$YSi(OR)_3$$

where each R is an alkyl group and Y is a monovalent non-hydrolyzable organic radical.

4. The method of claim 3 wherein Y is a saturated or unsaturated monovalent hydrocarbon group or a substituted derivative thereof.

5. The method of claim 4 wherein Y is selected from the group consisting of alkyl and alkenyl groups and substituted derivatives thereof wherein each substituent is selected from the group consisting of halogen, alkoxy, and primary, secondary and tertiary amino groups.

6. The method of claim 2 wherein said silane comprises a mixture including a silane containing a primary, secondary or tertiary aminoalkyl group.

7. The method of claim 6 wherein said mixture comprises at least one silane selected from the group consisting of alkyl trialkoxysilanes and alkenyl trialkoxysilanes and at least one silane selected from primary, secondary and tertiary aminoalkyl trialkoxysilanes.

8. The method of claim 2 wherein said silane is at least partially hydrolyzed prior to its application to said surface.

9. The method of claim 2 wherein said silane is applied from solution and the resulting coating is treated to remove the solvent.

10. The method of claim 9 wherein said solution is applied by spin-coating.

11. The method of claim 1 wherein said hydrolyzable fluorosilane has the formula:

$$R^2{}_m SiR^3{}_n R^4{}_p$$

where m is 1 or 2, n is at least 1, p is 0, 1 or 2, the sum of m+n+p is 4, each $R^2$ is a fluorine-containing organic group, each $R^3$ is a hydrolyzable group and each $R^4$ is a non-hydrolyzable atom or group other than $R^2$ 12. The method of claim 11 wherein each $R^3$ is an alkoxy group.

13. The method of claim 12 wherein each said alkoxy group has 1 to 3 carbon atoms.

14. The method of claim 11 wherein m is 1, n is 3 and p is 0.

15. The method of claim 14 wherein each $R^3$ is an alkoxy group.

16. The method of claim 15 wherein each said alkoxy group has 1 to 3 carbon atoms.

17. The method of claim 11 wherein each $R^2$ has the structure:

$$X_3C-(CF_2)_x-(Z)_y-(CH_2)_z-$$

where each X is F or CF$_3$, Z is a divalent atom or group, each of x and z is zero or a positive integer, and y is zero or 1.

18. The method of claim 11, wherein R$^4$ is F.

19. The method of claim 1 wherein said surface comprises an area surrounding a jet orifice of an ink jet recording head, said orifice being formed before or after the formation of said fluorosilane coating.

20. The method of claim 1 wherein said layer of cured siloxane contains free hydroxyl groups attached to silicon atoms and said second layer is chemically bonded to said first layer by reaction with said hydroxyl groups.

21. The method of claim 20 wherein said free hydroxyl groups are obtained by effecting at least the final stages of curing of said siloxane layer in the presence of water vapor.

22. The method of claim 1 wherein said fluorosilane layer is applied by vacuum deposition from fluorosilane vapor.

23. The method of claim 1 wherein said fluorosilane layer is heated in contact with said siloxane layer.

24. The method of claim 1 wherein said surface comprises a plastic material selected from the group consisting polyimide, polycarbonate, polyester, and polyether-ether-ketone.

25. An ink jet recording head comprising a fluorosilane coating obtained by the method of claim 1.

26. An ink jet recording head of the type in which ink droplets are jetted from a jet orifice of said head toward a recording material, said head defining a surface surrounding said jet orifice comprising plastic or non-vitreous inorganic material coated with a fluorosilane layer which reduces the wettability of said surface, with a layer comprising cured siloxane which is adherent to said surface interposed between said surface and said fluorosilane layer, said fluorosilane layer being derived from at least one fluorosilane having at least one hydrolyzable group attached to a silicon atom.

27. An ink jet recording head of the type wherein ink droplets are jetted from a jet orifice of said head toward a recording material and wherein said head defines a surface comprising at least one solvent-wettable zone and at least one zone which exhibits poor solvent-wettability, said latter zone comprising a layer of fluorosilane bonded to said surface by means of an intermediate layer comprising cured siloxane.

28. The ink jet recording head of claim 27 in which said cured siloxane is derived from at least one silane of the formula $$YSi(OR)_3$$

wherein each R is an alkyl group and Y is a monovalent non-hydrolyzable organic radical.

29. The ink jet recording head of claim 28 in which Y is a saturated or unsaturated monovalent hydrocarbon group or a substituted derivative thereof.

30. The ink jet recording head of claim 29 in which Y is selected from alkyl and alkenyl groups and substituted derivatives thereof wherein each substituent is selected from the group consisting of halogen, alkoxy, and primary, secondary or tertiary amino groups.

31. The ink jet recording head of claim 28 wherein said silane comprises a mixture including a silane containing a group selected from the group consisting of primary, secondary and tertiary amino-alkyl groups.

32. The ink jet recording head of claim 31 in which said silane comprises at least one silane selected from the group consisting of alkyl trialkoxysilanes and alkenyl trialkoxy silanes, and at least one primary, secondary or tertiary aminoalkyl trialkoxysilane.

33. The ink jet recording head of claim 27 wherein the said fluorosilane has the formula:

$$R^2{}_m SiR^3{}_n R^4{}_p$$

where m is 1 or 2, n is at least 1, p is 0, 1 or 2, the sum of m+n+p is 4, each R$^2$ is a fluorine-containing organic group, each R$^3$ is a hydrolyzable group and each R$^4$ is a non-hydrolyzable atom or group other than R$^2$.

34. The ink jet recording head of claim 33 in which each R$^3$ is an alkoxy group.

35. The ink jet recording head of claim 34 in which the alkoxy group has 1 to 3 carbon atoms.

36. The ink jet recording head of claim 33 in which m is 1 and n is 3.

37. The ink jet recording head of claim 36 wherein each R$^3$ is an alkoxy group.

38. The ink jet recording head of claim 37 wherein each said alkoxy group has 1 to 3 carbon atoms.

* * * * *